United States Patent
Gentile, Jr. et al.

(10) Patent No.: US 8,096,591 B2
(45) Date of Patent: Jan. 17, 2012

(54) SPLIT JOINT RESTRAINT DEVICE WITH DUAL PIPE SIZE CAPABILITY

(75) Inventors: Zachary J. Gentile, Jr., Gardendale, AL (US); Earl Sinjon Bradberry, Vestavia Hills, AL (US); Adam Pennington, Talladega, AL (US); John K. Lonergan, Pell City, AL (US)

(73) Assignee: The Ford Meter Box Company, Inc., Wabash, IN (US)

( * ) Notice: Subject to any disclaimer, the term of this patent is extended or adjusted under 35 U.S.C. 154(b) by 278 days.

(21) Appl. No.: 12/468,251

(22) Filed: May 19, 2009

(65) Prior Publication Data

US 2011/0121567 A1    May 26, 2011

Related U.S. Application Data

(60) Provisional application No. 61/054,264, filed on May 19, 2008.

(51) Int. Cl.
*F16L 23/00* (2006.01)
(52) U.S. Cl. ........ 285/415; 285/412; 285/12; 29/525.02
(58) Field of Classification Search .................. 285/411, 285/412, 413, 415, 366, 368, 12; 29/237, 29/890.14, 525.02, 463
See application file for complete search history.

(56) References Cited

U.S. PATENT DOCUMENTS

| 570,975 | A | * | 11/1896 | Anderson | 285/412 |
| 2,459,251 | A | * | 1/1949 | Stillwagon | 285/104 |
| 3,267,547 | A | * | 8/1966 | Morriss, Jr. | 24/279 |
| 4,336,959 | A | * | 6/1982 | Roche | 285/415 |
| 4,643,458 | A | * | 2/1987 | Ammar | 285/412 |
| 4,721,330 | A | * | 1/1988 | Woodhouse | 285/337 |
| 5,190,324 | A | * | 3/1993 | Bird et al. | 285/368 |
| 6,065,784 | A | * | 5/2000 | Lundstrom | 285/368 |
| 7,384,076 | B2 | * | 6/2008 | Bradley | 285/373 |
| 7,625,017 | B1 | * | 12/2009 | Radzik | 285/415 |

* cited by examiner

*Primary Examiner* — David E Bochna
(74) *Attorney, Agent, or Firm* — Kenneth M. Bush; Bush Intellectual Property Law

(57) ABSTRACT

A split ring restraint device having dual pipe size capability for securing the connection between adjacent pipes in water piping systems to prevent leakage or failure of the pipe connection. The restraint device comprises an interlocking, stepped joining interface that can be assembled in one orientation to fit a pipe having a first outside diameter and assembled in another orientation to fit a pipe having a second outside diameter. The restraint device can be used without modification on pipes having different outside diameters. The restraint device can be installed more rapidly than current state-of-the art split ring restraint devices.

7 Claims, 7 Drawing Sheets

SPLIT JOINT RESTRAINT DEVICE WITH DUAL PIPE SIZE CAPABILITY

CROSS REFERENCE TO RELATED PATENT APPLICATION

The present application claims priority to U.S. Provisional Patent Application No. 61/054,264, filed May 19, 2008, the disclosure of which is incorporated herein by reference.

FIELD OF THE INVENTION

The present invention is directed to water piping systems, and more particularly, to devices for securing the connection between adjacent pipes in water piping systems to prevent leakage or failure of the pipe connection.

BACKGROUND OF THE INVENTION

Piping systems used in the water works industry are subject to axial thrust forces that are developed whenever there is a change in the direction of flow. It is necessary to have a means of resisting the thrust forces, or the piping system may separate and leak at the joined connections. Concrete "thrust blocks" were the primary method of resisting thrust forces for much of the twentieth century. In the 1960s, the concept of a mechanical device to provide thrust restraint was developed. There are currently several different mechanical methods and devices for providing thrust restraint. Some of these devices provide thrust restraint and may also be used to compress a gasket to seal the piping system. Most of these devices have a circular array of gripping components, often referred to as wedges or segments, that work together with a ring, or gland, to provide uniform thrust restraint. The gland joins the gripping components and also compresses a gasket.

Another class of device provides only thrust restraint. One of the earliest devices developed only for thrust restraint and intended for use on polyvinyl chloride (PVC) pipe is a metallic ring that has serrations (a thread profile) on the surface that contacts the pipe outside diameter (OD). The ring is typically split into two (or more) equal sections. The ring is then assembled on the outside surface of the pipe and clamped together to assure the serrations penetrate into the outer surface of the pipe. The penetration of the serrations into the outer surface of the pipe prevents movement of the ring. The ring in combination with another similar restraint, or a non-serrated ring that rests on a pipe bell, connected across a joint by rods can be used to prevent joint separation.

There are two prevalent series of PVC pipe used in the water works industry. The first series has ODs that are cast-iron-pipe-equivalent (CI) and the second series has ODs that match steel-pipe-equivalent (IPS) dimensions. The ODs on 4-12" nominal PVC distribution pipe differ by 0.27" (6" nominal) to 0.45" (12" nominal). Typically a split ring type restraint must be designed to fit one pipe series as the inner diameter (ID) of the ring is sized to allow a certain amount of interference with the OD of the pipe. It is also typical (especially on CI sized pipe) for the split rings to mate up fully on installation, often referred to as "pad-to-pad", as an in indicator that the ring is properly installed.

SUMMARY OF THE INVENTION

The present invention is a split ring restraint device having dual pipe size capability for securing the connection between adjacent pipes in water piping systems to prevent leakage or failure of the pipe connection. The restraint device comprises an interlocking, stepped joining interface that can be assembled in one orientation to fit a pipe having a first outside diameter and assembled in another orientation to fit a pipe having a second outside diameter. The restraint device can be used without modification on pipes having different outside diameters. The restraint device can be installed more rapidly than current state-of-the art split ring restraint devices.

In the preferred embodiments, the present invention comprises a split, serrated ring for attachment on a pipe section to provide axial thrust restraint to forces typical of a pressurized piping system. The ring preferably comprises two arcuate sections, each having an inner serrated surface. The first arcuate section has a first mating member having a recessed portion and a slotted opening therethrough, and a second mating member having a flanged portion and a slotted opening therethrough. The slotted openings facilitate rapid installation. The second arcuate section has a first mating member having a recessed portion and an opening therethrough, and a second mating member having a flanged portion and an opening therethrough. The ring has two configurations that depend on the relative orientation of its sections. In the first configuration, the interfaces between the recessed portions and flanged portions are configured so that the flanged portion of the first section fits within the recessed portion of the second section and the flanged portion of the second section fits within the recessed portion of the first section, thus providing a reduced inner diameter of the ring to result in sufficient penetration of the serrations into a smaller outside diameter pipe. In the second configuration, the interfaces between the recessed portions and flanged portions are configured so that the flanged portion of the first section engages the flanged portion of the second section and the recessed portion of the first section engages the recessed portion of the second section, thus providing an expanded inner diameter of the ring to result in sufficient penetration of the serrations into a larger outside diameter pipe.

These and other features of the invention will become apparent from the following detailed description of the invention.

DETAILED DESCRIPTION OF THE INVENTION

Figure 1:
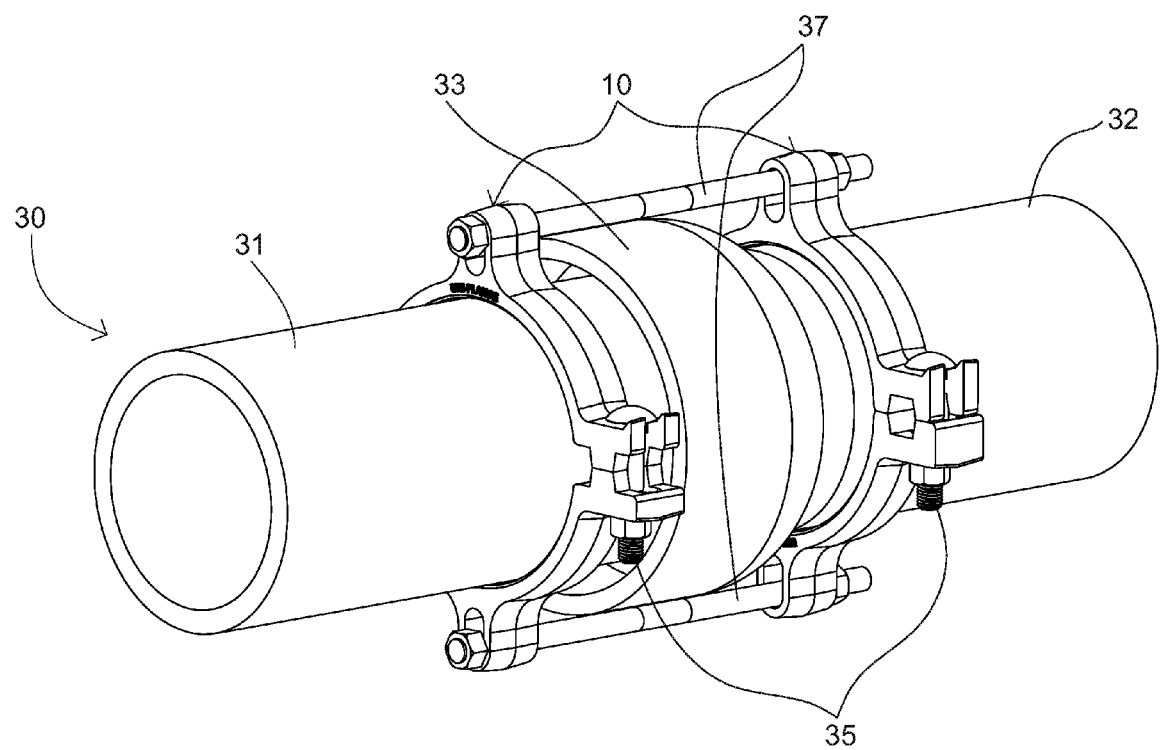
FIG. 1 shows an isometric view of the present invention assembled in tandem on a cast-iron-pipe-equivalent sized pipe joint section with connecting rods.
Figure 2:
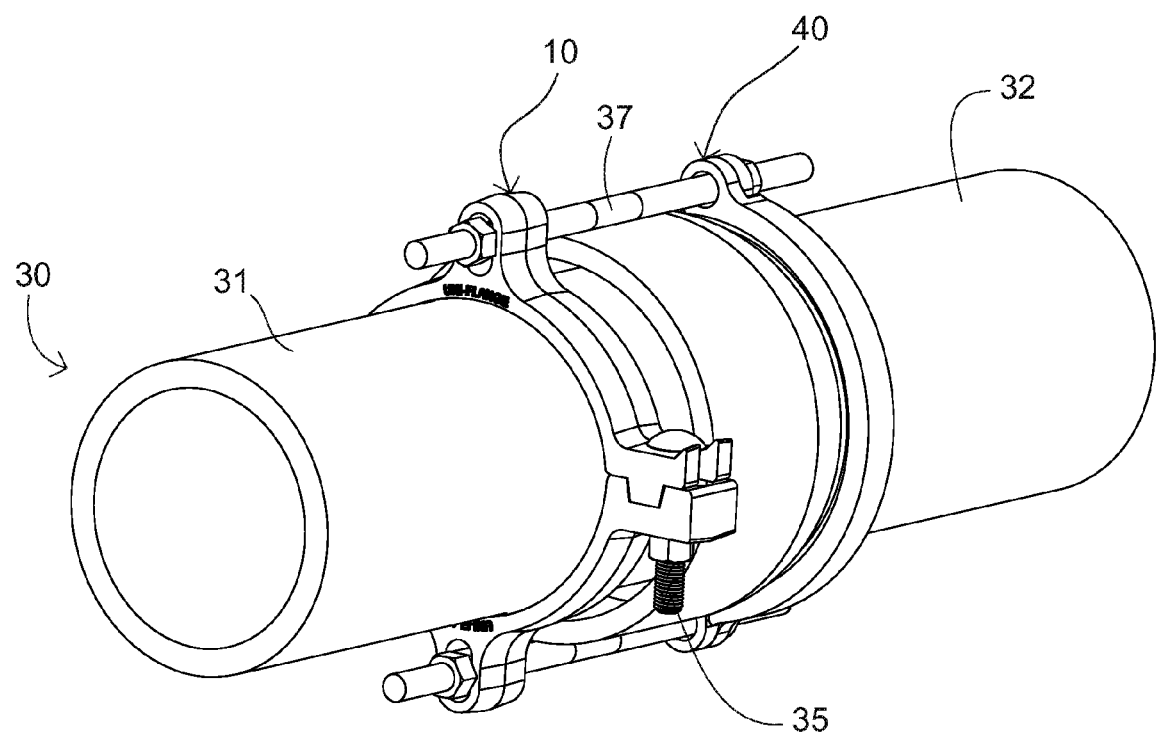
FIG. 2 shows an isometric view of the present invention assembled with a backup ring and connecting rods on a steel-pipe-equivalent sized pipe joint section.
Figure 3:
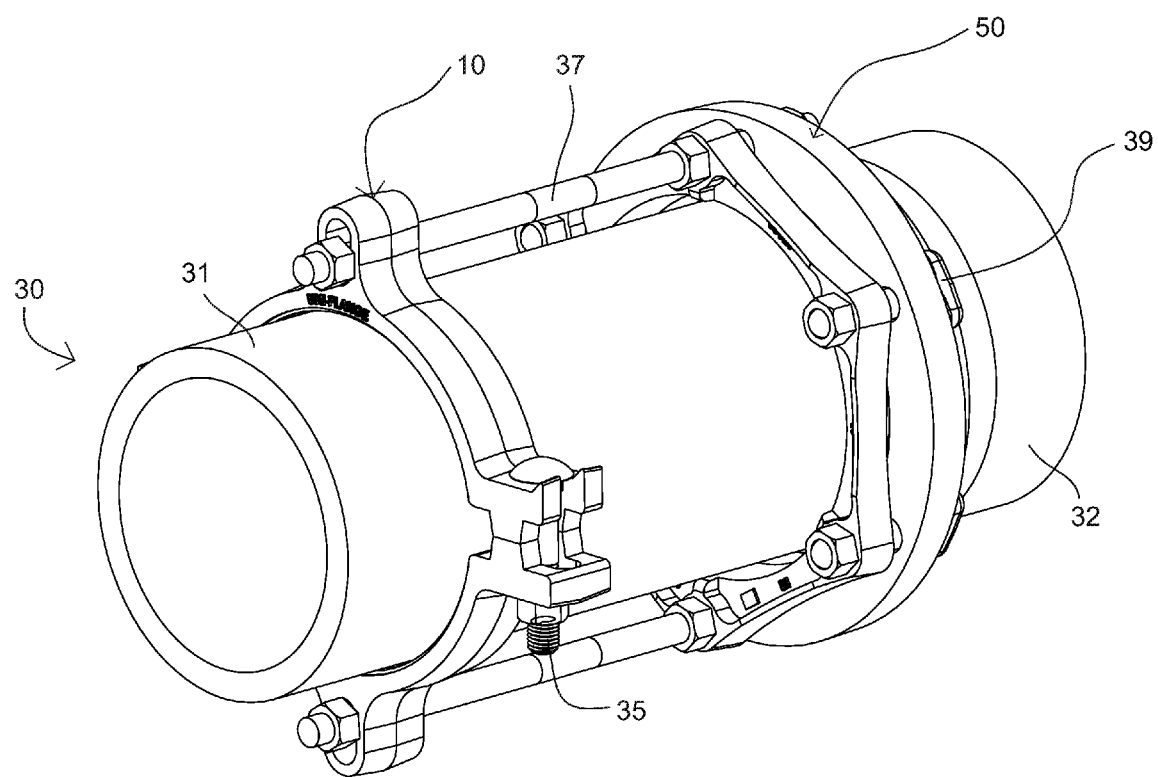
FIG. 3 shows an isometric view of the present invention assembled with a mechanical joint gland to a mechanical joint receiver with connecting rods.
Figure 4:
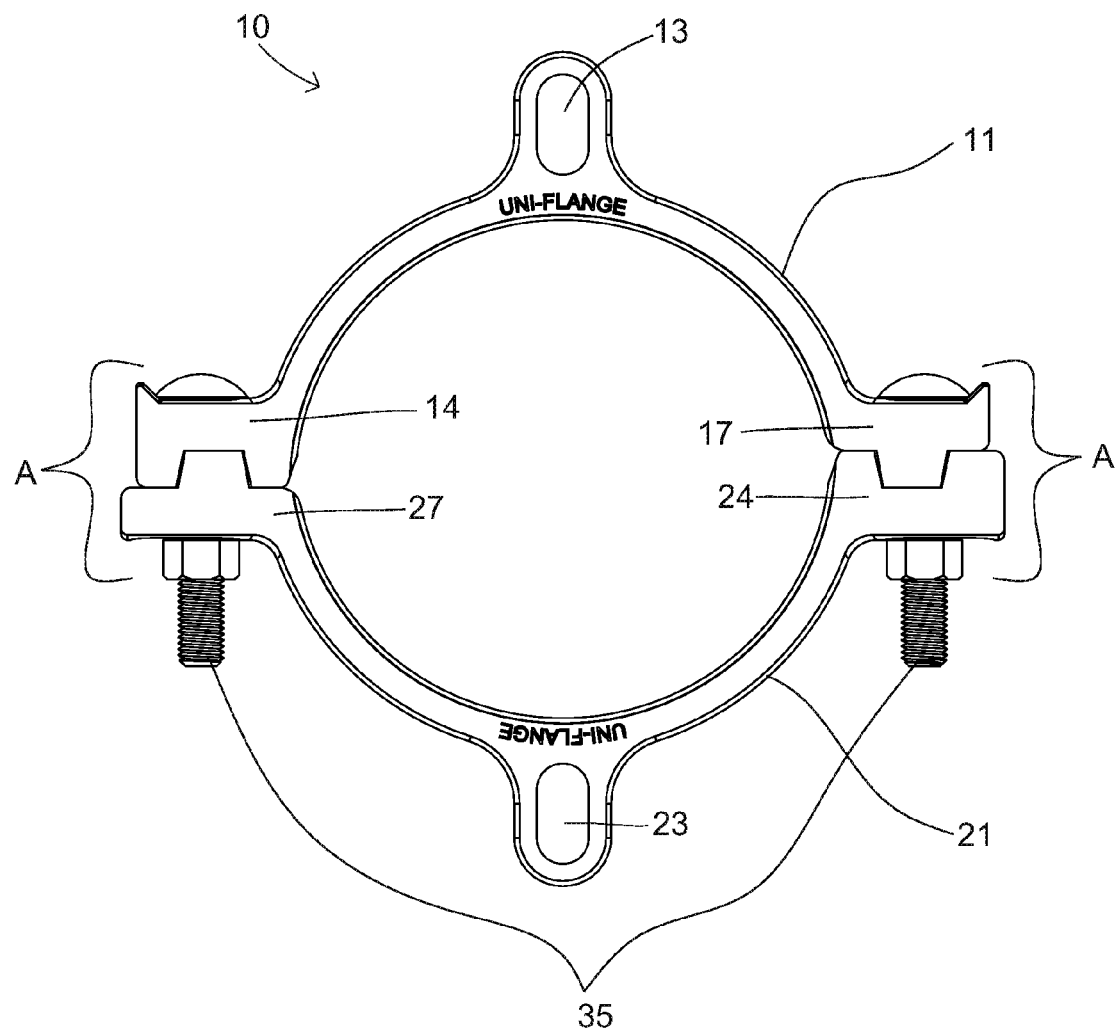
FIG. 4 shows a front elevational view of the present invention as intended for steel-pipe-equivalent outside diameter pipe.
Figure 5:
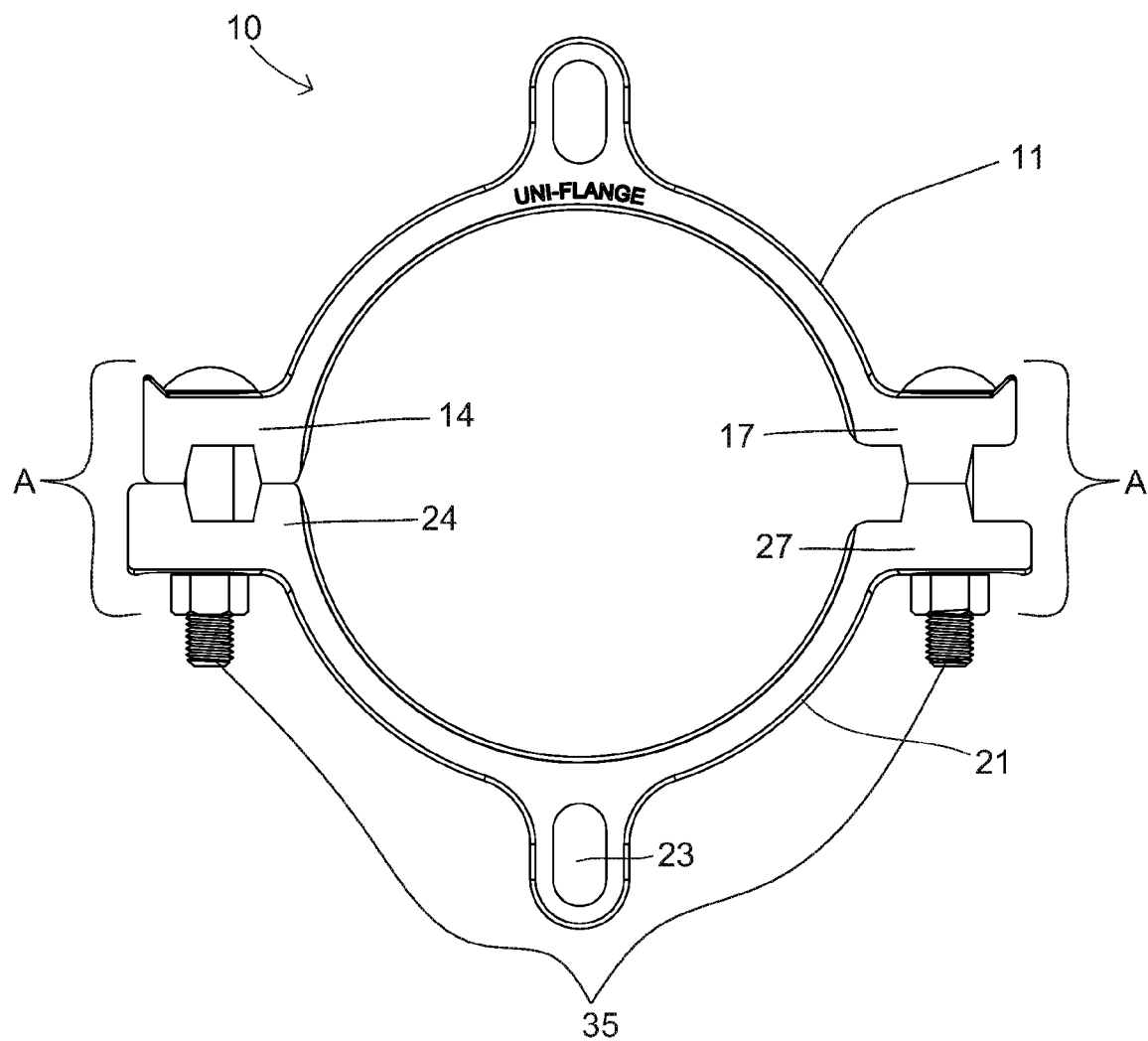
FIG. 5 shows a front elevational view of the present invention as intended for cast-iron-pipe-equivalent outside diameter pipe.
Figure 6:
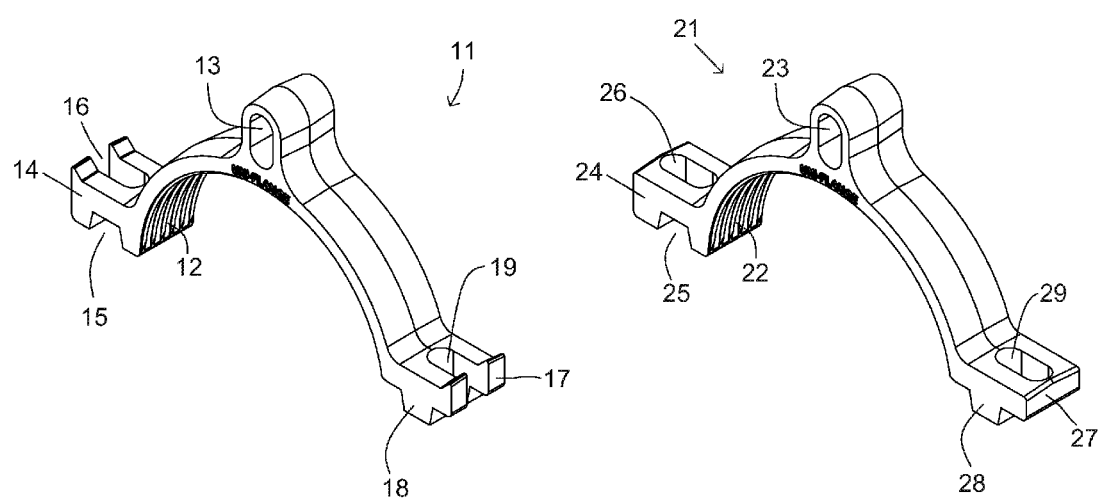
FIG. 6 shows an isometric view of a top half section and a bottom half section of the present invention.

The present invention is an improved split ring restraint that comprises an interlocking, stepped joining interface that can be assembled in one orientation to fit steel-pipe-equivalent (IPS) outside diameter (OD) pipe and assembled in another orientation to fit cast-iron-pipe-equivalent (CI) outside diameter (OD) pipe. The restraint can be used without modification on steel-pipe-equivalent outside diameter or cast-iron-pipe-equivalent outside diameter pipe. The restraint can be installed more rapidly than the current state-of-the art split ring restraints.

In the preferred embodiments illustrated in FIGS. 1-6, the present invention is preferably a split, serrated ring 10 for attachment on a pipe section 30 to provide axial thrust restraint to forces typical of a pressurized piping system. The ring 10 preferably comprises two arcuate sections 11, 21, each having an inner serrated surface 12, 22. The arcuate sections 11, 21 can be symmetrical or non-symmetrical. The first arcuate section 11 has a channel 13 therethrough, a first mating member 14 having a recessed portion 15 and a slotted opening 16 therethrough, and a second mating member 17 having a flanged portion 18 and a slotted opening 19 therethrough. The second arcuate section 21 has a channel 23 therethrough, a first mating member 24 having a recessed portion 25 and an opening 26 therethrough, and a second mating member 27 having a flanged portion 28 and an opening 29 therethrough. The slotted openings 16, 19 facilitate rapid installation. The pipe section 30 comprises a first pipe 31 connected to a second pipe 32 at a pipe joint 33.

In use, the ring 10 is assembled onto the first pipe 31 and sufficient torque is applied to clamping bolts 35 to allow the serrated surfaces 12, 22 to penetrate the surface of the first pipe 31. In the embodiment shown in FIG. 1, a second identical split ring 10 is assembled onto the second pipe 32 and the two split rings 10 are attached to each other with connecting rods 37, thus securing the pipe joint 33. In the embodiment shown in FIG. 2, a back-up ring 40 is assembled onto the second pipe 32 and the two rings 10, 40 are attached to each other with connecting rods 37, thus securing the pipe joint 33. In the embodiment shown in FIG. 3, the ring 10 is attached to a mechanical joint (MJ) receiver 50 with connecting rods 37 and tee-head bolts 39, thus securing the pipe joint 33. In all the embodiments, the ring 10 is firmly affixed to the first pipe 31 and will prevent the separation of the pipe joint 33.

The ring 10 has two configurations that depend on the relative orientation of its sections 11, 21. In the first configuration, illustrated in FIGS. 2 and 4, the interfaces A between the recessed portions 15, 25 and flanged portions 18, 28 are configured so that the flanged portion 18 of the first section 11 fits within the recessed portion 25 of the second section 21 and the flanged portion 28 of the second section 21 fits within the recessed portion 15 of the first section 11, thus providing a reduced inner diameter of the ring to result in sufficient penetration of the serrations 12, 22 into the steel-pipe-equivalent outside diameter pipe. In the second configuration, illustrated in FIGS. 1, 3 and 5, the interfaces A between the recessed portions 15, 25 and flanged portions 18, 28 are configured so that the flanged portion 18 of the first section 11 engages the flanged portion 28 of the second section 21 and the recessed portion 15 of the first section 11 engages the recessed portion 25 of the second section 21, thus providing an expanded inner diameter of the ring to result in sufficient penetration of the serrations 12, 22 into the cast-iron-pipe-equivalent outside diameter pipe.

Figure 7:
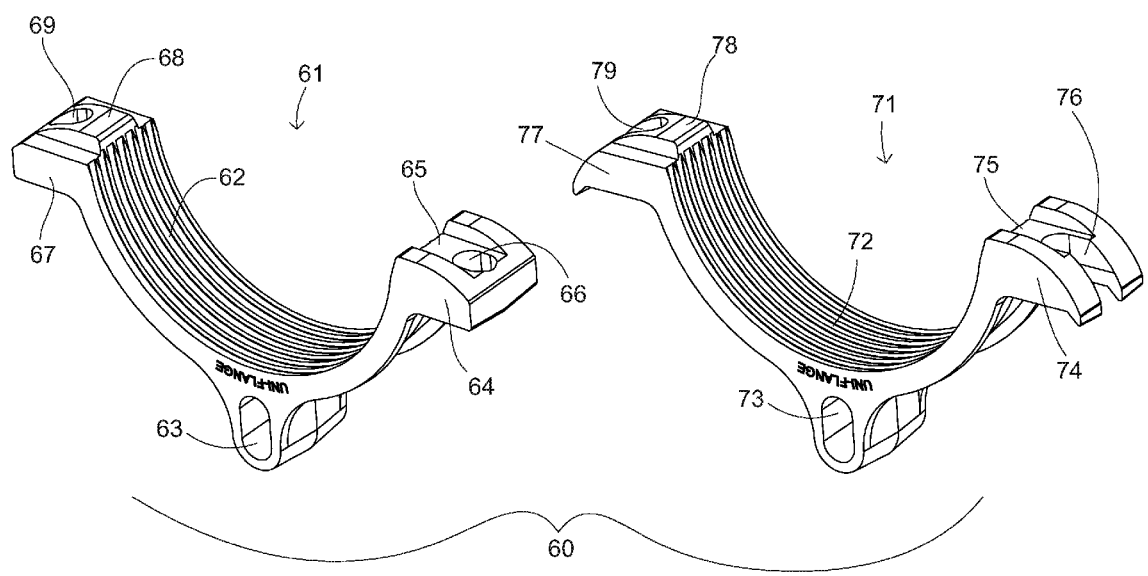
FIG. 7 shows an isometric view of a top half section and a bottom half section of an alternate embodiment of the present invention.

In an alternate embodiment shown in FIG. 7, the invention comprises a split, serrated ring 60 having two arcuate sections 61, 71, each having an inner serrated surface 62, 72. The first arcuate section 61 has a channel 63 therethrough, a first mating member 64 having a recessed portion 65 and an opening 66 therethrough, and a second mating member 67 having a flanged portion 68 and an opening 69 therethrough. The second arcuate section 71 has a channel 73 therethrough, a first mating member 74 having a recessed portion 75 and a slotted opening 76 therethrough, and a second mating member 77 having a flanged portion 78 and a slotted opening 79 therethrough. The ring 60 of FIG. 7 can be configured about a pipe joint as described above.

While the invention has been shown and described in some detail with reference to specific exemplary embodiments, there is no intention that the invention be limited to such detail. On the contrary, the invention is intended to include any alternative or equivalent embodiments that fall within the spirit and scope of the invention as described herein.

The invention claimed is:

1. A split ring for securing a pipe joint from separation due to axial thrust, comprising:
   a. a first arcuate member having a channel for receiving a first connecting member therethrough, a first mating member having a recessed portion and an opening for receiving a first fastener therethrough, a second mating member having a flanged portion and an opening for receiving a second fastener therethrough, and a serrated inner surface for directly engaging a pipe surface; and
   b. a second arcuate member having a channel for receiving a second connecting member therethrough, a first mating member having a recessed portion and an opening for receiving a fastener therethrough, a second mating member having a flanged portion and an opening for receiving a fastener therethrough, and a serrated inner surface for directly engaging a pipe surface;
   c. wherein said split ring is operable to directly and securely engage a pipe surface having a first outer diameter when said split ring is assembled in a first configuration wherein said flanged portion of said first mating member fits within said recessed portion of said second mating member and said flanged portion of said second mating member fits within said recessed portion of said first mating member; and
   d. wherein said split ring is further operable to directly and securely engage a pipe surface having a second outer diameter when said split ring is assembled in a second configuration wherein said flanged portion of said first mating member engages said flanged portion of said second mating member and said recessed portion of said first mating member engages said recessed portion of said second mating member.

2. A split ring according to claim 1, wherein said openings through said first arcuate member are slotted to facilitate rapid assembly of said split ring.

3. A secured pipe joint assembly, comprising:
   a. a pipe assembly comprising a first pipe having a first end, a second pipe having a second end, and a joint wherein said first end of said first pipe engages said second end of said second pipe;
   b. a first ring affixed around said first pipe, wherein said first ring comprises a first arcuate member having a channel for receiving a connecting member therethrough, a first mating member having a recessed portion and an opening for receiving a fastener therethrough, a second mating member having a flanged portion and an opening for receiving a fastener therethrough, and a serrated inner surface for directly engaging a pipe surface, and a second arcuate member having a channel for receiving a connecting member therethrough, a first mating member having a recessed portion and an opening for receiving a fastener therethrough, a second mating member having a flanged portion and an opening for receiving a fastener therethrough, and a serrated inner surface for directly engaging a pipe surface;

c. a plurality of fasteners securing said first arcuate member to said second arcuate member;

d. a second ring affixed around said second pipe, wherein said second ring comprises at least two channels for receiving connecting members therethrough; and e. a plurality of connecting members securing said first ring to said second ring and thereby securing said pipe joint from separation due to axial thrust;

f. wherein said first ring is operable to directly and securely engage an outer surface of said first pipe having a first outer diameter when said first ring is assembled in a first configuration wherein said flanged portion of said first mating member fits within said recessed portion of said second mating member and said flanged portion of said second mating member fits within said recessed portion of said first mating member; and g. wherein said first ring is further operable to directly and securely engage an outer surface of said first pipe having a second outer diameter when said first ring is assembled in a second configuration wherein said flanged portion of said first mating member engages said flanged portion of said second mating member and said recessed portion of said first mating member engages said recessed portion of said second mating member.

4. An assembly according to claim 3, wherein said openings through said first arcuate member are slotted to facilitate rapid assembly of said first ring.

5. A method for securing a pipe joint between a first pipe and a second pipe, comprising the steps of:

a. affixing a first ring around said first pipe, wherein said first ring comprises a first arcuate member having a channel for receiving a first connecting member therethrough, a first mating member having a recessed portion and an opening for receiving a first fastener therethrough, and a second mating member having a flanged portion and an opening for receiving a second fastener therethrough, and a second arcuate member having a channel for receiving a second connecting member therethrough, a first mating member having a recessed portion and an opening for receiving a fastener therethrough, and a second mating member having a flanged portion and an opening for receiving a fastener therethrough;

b. affixing a second ring around said second pipe, wherein said second ring comprises at least two channels for receiving said first connecting member and said second connecting member therethrough; and c. securing said first ring to said second ring with said first connecting member and said second connecting member and thereby securing said pipe joint from separation due to axial thrust;

d. wherein said first ring is operable to securely engage an outer surface of said first pipe having a first outer diameter when said first ring is assembled in a first configuration wherein said flanged portion of said first mating member fits within said recessed portion of said second mating member and said flanged portion of said second mating member fits within said recessed portion of said first mating member; and e. wherein said first ring is further operable to securely engage an outer surface of said first pipe having a second outer diameter when said first ring is assembled in a second configuration wherein said flanged portion of said first mating member engages said flanged portion of said second mating member and said recessed portion of said first mating member engages said recessed portion of said second mating member.

6. A method according to claim 5, wherein said first arcuate member and said second arcuate member each have a serrated inner surface.

7. A method according to claim 5, wherein said openings through said first arcuate member are slotted to facilitate rapid assembly of said first ring.

\* \* \* \* \*